United States Patent
Watfa et al.

(10) Patent No.: US 11,737,019 B2
(45) Date of Patent: Aug. 22, 2023

(54) APPLICATION LAYER GROUP SERVICES FOR MACHINE TYPE COMMUNICATIONS

(71) Applicant: INTERDIGITAL PATENT HOLDINGS, INC., Wilmington, DE (US)

(72) Inventors: Mahmoud Watfa, Saint Leonard (CA); Guanzhou Wang, Brossard (CA); Ulises Olvera-Hernandez, London (GB); Behrouz Aghili, Commack, NY (US); Pascal M. Adjakple, Great Neck, NY (US); Dimitrios Karampatsis, Ruislip (GB); Saad Ahmad, Montreal (CA); Amir Helmy, Vancouver (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/431,514

(22) Filed: Jun. 4, 2019

(65) Prior Publication Data
US 2019/0349852 A1 Nov. 14, 2019

Related U.S. Application Data

(63) Continuation of application No. 15/321,139, filed as application No. PCT/US2015/037994 on Jun. 26, 2015, now Pat. No. 10,313,969.
(Continued)

(51) Int. Cl.
*H04W 52/02* (2009.01)
*H04W 4/08* (2009.01)
*H04W 4/70* (2018.01)

(52) U.S. Cl.
CPC ......... *H04W 52/0212* (2013.01); *H04W 4/08* (2013.01); *H04W 4/70* (2018.02); *Y02D 30/70* (2020.08)

(58) Field of Classification Search
None
See application file for complete search history.

(56) References Cited

U.S. PATENT DOCUMENTS

| 6,940,844 B2 | 9/2005 | Purkayastha et al. |
| 8,345,556 B2 | 1/2013 | Mitsutake |
| | (Continued) | |

FOREIGN PATENT DOCUMENTS

| CN | 102404792 | 4/2012 |
| CN | 103079184 | 5/2013 |
| | (Continued) | |

OTHER PUBLICATIONS

3rd Generation Partnership Project (3GPP), S2-141771, "Discussion of Group-specific Congestion Control," NTT DoCoMo et al., SA WG2 Temporary Document, SA WG2 Meeting #103, Phoenix, Arizona, USA, 5 pages (May 19-23, 2014).
(Continued)

*Primary Examiner* — Shirpal K Khajuria
(74) *Attorney, Agent, or Firm* — Volpe Koenig

(57) ABSTRACT

Procedures, mechanisms, methods, and techniques are provided that trigger power saving mode (PSM) functionality in the at least one wireless transmit receive units, group of WTRUs or subset of the group of WTRUs. The trigger may be in response to an application layer request to set one or more predetermined PSM settings, wherein the trigger originates from one or more application servers (APs) directed to a core network by way of an interface such as an SCEF that may be included on a device (e.g., a gateway, computing device, and/or the like) and may be configured for enabling the application server to request enabling and disabling PSM functionality.

8 Claims, 9 Drawing Sheets

Related U.S. Application Data

(60) Provisional application No. 62/017,501, filed on Jun. 26, 2014.

(56) References Cited

U.S. PATENT DOCUMENTS

| | | | |
|---|---|---|---|
| 8,903,376 | B2 | 12/2014 | Watfa et al. |
| 9,001,655 | B2 | 4/2015 | Watfa et al. |
| 9,578,542 | B2 | 2/2017 | Zhang et al. |
| 2008/0189360 | A1 | 8/2008 | Kiley et al. |
| 2010/0062725 | A1* | 3/2010 | Ryu .................. H04W 52/0251 455/69 |
| 2010/0130219 | A1* | 5/2010 | Cave ................ H04W 72/0453 455/450 |
| 2012/0164954 | A1 | 6/2012 | Karampatsis et al. |
| 2012/0230178 | A1 | 9/2012 | Wang et al. |
| 2014/0044029 | A1* | 2/2014 | Chou ................ H04W 52/0216 370/331 |
| 2014/0194110 | A1 | 7/2014 | Suerbaum et al. |
| 2015/0117285 | A1* | 4/2015 | Xie .................. H04W 52/0209 370/311 |
| 2015/0365891 | A1* | 12/2015 | Marcks Von Wurtemberg ........... H04W 52/0216 370/311 |
| 2016/0381639 | A1* | 12/2016 | Kim ...................... H04W 76/18 370/311 |

FOREIGN PATENT DOCUMENTS

| | | |
|---|---|---|
| CN | 103379593 | 10/2013 |
| JP | 2014-511659 | 5/2014 |
| WO | 00/59239 | 10/2000 |
| WO | 2011100570 A1 | 8/2011 |

OTHER PUBLICATIONS

3rd Generation Partnership Project (3GPP), S2-141871, "Updated WID timeline: Group based enhancements," Huawei et al., SA WG2 Meeting #103, Phoenix, Arizona, USA, 5 pages (May 19-23, 2014).

3rd Generation Partnership Project, S2-141176, "Discussion on a Service Capability Exposure Framework," Huawei, SA WG2 Meeting #102, St. Julian's, Malta, pp. 1-3 (Mar. 24-28, 2014).

Huawei et al., "Update of Solution 3—Monitoring via MME/SGSN," SA WG2 Meeting #106, S2-144448, San Francisco, California, USA (Nov. 17-21, 2014).

Interdigital, "Downlink Data Transmission after Notification about exit or deactivation of PSM," SA WG2 Meeting #106, S2-144134, San Francisco, California, USA (Nov. 17-21, 2014).

Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.4.0 (Mar. 2014).

Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.9.0 (Jun. 2015).

Third Generation Partnership Project, "Technical Specification Group Core Network and Terminals; Non-Access-Stratum (NAS) protocol for Evolved Packet System (EPS); Stage 3 (Release 13)," 3GPP TS 24.301 V13.2.0 (Jun. 2015).

Third Generation Partnership Project, "Technical Specification Group Services and System Aspects; Architecture enhancements to facilitate communications with packet data networks and applications (Release 12)," 3GPP TS 23.682 V12.2.0 (Jun. 2014).

Third Generation Partnership Project, "Technical Specification Group Services and System Aspects; Architecture enhancements to facilitate communications with packet data networks and applications (Release 12)," 3GPP TS 23.682 V12.4.0 (Jun. 2015).

Third Generation Partnership Project, "Technical Specification Group Services and System Aspects; Architecture enhancements to facilitate communications with packet data networks and applications (Release 13)," 3GPP TS 23.682 V13.2.0 (Jun. 2015).

Third Generation Partnership Project, "Technical Specification Group Core Network and Terminals; Mobile radio interface Layer 3 specification; Core network protocols; Stage 3 (Release 12),"3GPP TS 24.008 V12.5.0 (Mar. 2014).

Third Generation Partnership Project, "Technical Specification Group Core Network and Terminals; Mobile radio interface Layer 3 specification; Core network protocols; Stage 3 (Release 12)," 3GPP TS 24.008 V12.9.0 (Mar. 2015).

Third Generation Partnership Project, "Technical Specification Group Core Network and Terminals; Mobile radio interface Layer 3 specification; Core network protocols; Stage 3 (Release 13)," 3GPP TS 24.008 V13.1.0 (Mar. 2015).

* cited by examiner

APPLICATION LAYER GROUP SERVICES FOR MACHINE TYPE COMMUNICATIONS

CROSS-REFERENCE TO RELATED APPLICATIONS

This application is a continuation of U.S. patent application Ser. No. 15/321,139 filed on Dec. 21, 2016, which is the U.S. National Stage, under 35 U.S.C. § 371, of International Application No. PCT/US2015/037994, filed Jun. 26, 2015, which claims the benefit of U.S. Provisional Patent Application No. 62/017,501, filed Jun. 26, 2014, the contents of which are hereby incorporated by reference herein.

BACKGROUND

Machine type communication (MTC) devices, also referred to as machine to machine (M2M) communication devices, may provide a variety of MTC applications to support different wireless systems for services areas (e.g., security systems, tracking and tracing systems, payment systems, heath care systems. remote maintenance and control systems, metering systems and the like), as well as supporting wireless consumer electronic devices. Also, wireless transmit/receive units (WTRUs) are increasingly becoming available with MTC functionality. Such MTC devices may be referred to as MTC wireless transmit/receive units (MTC WTRU). With this proliferation of MTC WTRUs comes the potential for overloading a core network (CN) by way of possible sudden surges in MTC traffic (together with traffic generated by non-MTC WTRUs) and/or with power consumption. Currently, techniques for controlling congestion and/or managing power consumption (e.g., such as reachability of a device due to a power savings mode) caused by MTC WTRUs in a network may be available to network operators. Unfortunately, such techniques for congestion control and/or power consumption may not be available to third party companies who obtain subscriptions to the network to provide general or specific services by way of one or more application servers to individual MTC WTRUs or groups of WTRUs.

SUMMARY

Example implementations of a procedures, mechanisms and techniques for controlling congestion are described. Machine type communication (MTC) may be configured to provide application layer support for an application server by defining an interface disposed between the application server and a core network. The interface may be configured for enabling the application server to request enforcement of one or more rules and/or functions among at least one wireless transmit receive units, a group of WTRUs or a subset of the group of WTRUs.

An example of one or more requested rules and/or functions may include informing the at least one WTRUs, the group of WTRUs or the subset of the group of WTRUs of a service unavailability and a service resumption. The one or more rules and/or functions may enable the application server to change a power saving mode settings in the at least one WTRUs, the group of WTRUs or the subset of the group of WTRUs.

The interface may be a middle node, an intermediate node or a gateway function disposed between the application server and the core network. The middle node, intermediate node or gateway function may be referred to as an interworking function (IFW). The interface may be a direct interface disposed between the application server and the core network.

The application server may be configured to request enforcement of one or more rules and/or functions together with one or more request back off parameters.

An example of a procedures, mechanisms and techniques triggering power saving mode (PSM) functionality in at least one wireless transmit receive units, a group of WTRUs or a subset of the group of WTRUs is described. The trigger may be in response to an application layer request to set one or more predetermined PSM settings, wherein the trigger originates from one or more application servers (APs) directed to a core network by way of an interface configured for enabling the application server to request enabling and disabling PSM functionality.

The one or more predetermined PSM settings may include an indication to activate PSM in the at least one wireless transmit receive units, group of WTRUs or subset of the group of WTRUs and an indication to deactivate of PSM in the at least one wireless transmit receive units, group of WTRUs or subset of the group of WTRUs.

A serving node may be configured to a provided an active timer configured to control the PSM functionality.

The ASs may be configured to include an indication whether the serving nodes should or should not take one or more predetermined proactive measures. The predetermined proactive measures may be configured to change PSM settings in a WTRU, group of WTRUs or a subset of the group of WTRUs.

DETAILED DESCRIPTION

Figure 1A:
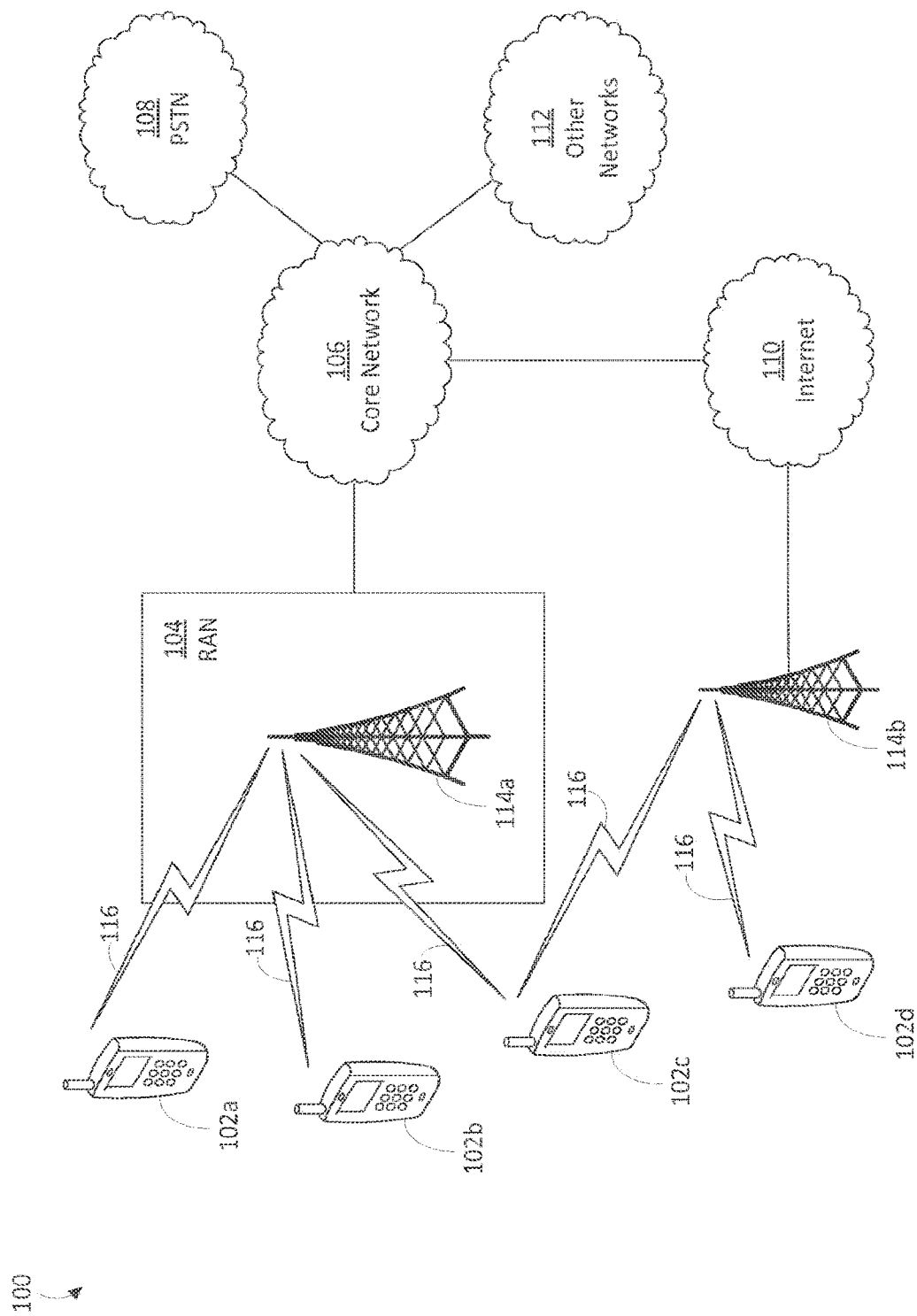
FIG. 1A depicts a system diagram of an example communications system in which one or more disclosed embodiments may be implemented.

Systems and/or methods may be provided for an application server to manage network congestion and/or power consumption. For example, systems and/or methods may FIG. 1A is a diagram of an example communications system 100 in which one or more disclosed embodiments (e.g., for managing power consumption such as a power saving mode (PSM) and/or network congestion using an application server and/or a network component or element) may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1.times., CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
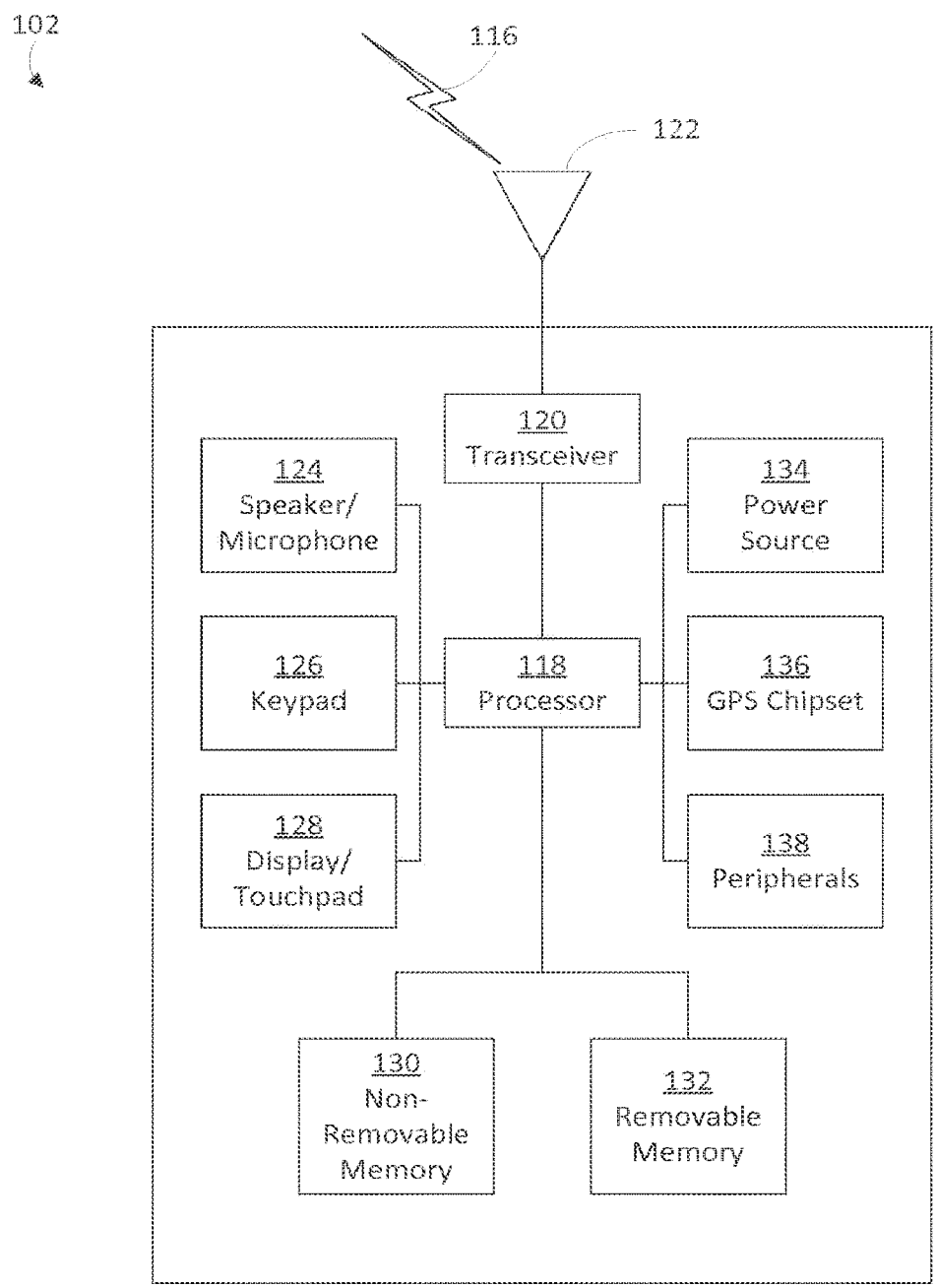
FIG. 1B depicts a system diagram of an example wireless transmit/receive unit (WTRU) that may be used within the communications system illustrated in FIG. 1A

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination procedures, processes or techniques while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth®, module, a frequency modulated (FM)

radio unit, a digital music player, a media player, a video game player module, an Internet browser, and the like.

Figure 1C:
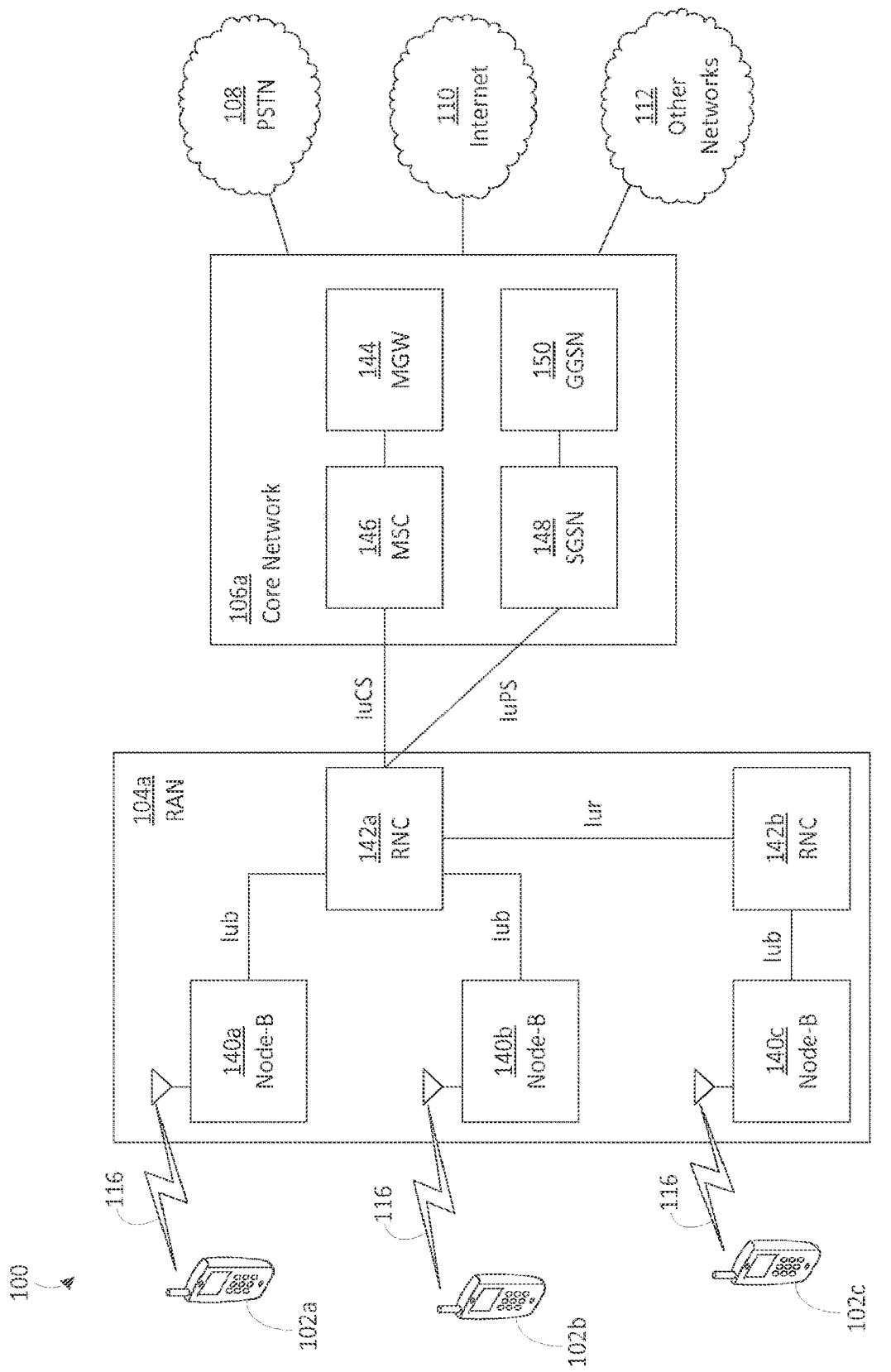
FIG. 1C depicts a system diagram of an example radio access network and an example core network that may be used within the communications system illustrated in FIG. 1A

FIG. 1C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, 102c over the air interface 116. The RAN 104a may also be in communication with the core network 106a, As shown in FIG. 1C, the RAN 104a may include Node-Bs 140a, 140b, 140c, which may each include one or more transceivers for communicating with the WTRUs 102a, 102b. 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106a may also be connected to the networks 112, which may include other wired or wireless networks that are owned and/or operated by other service providers.

Figure 1D:
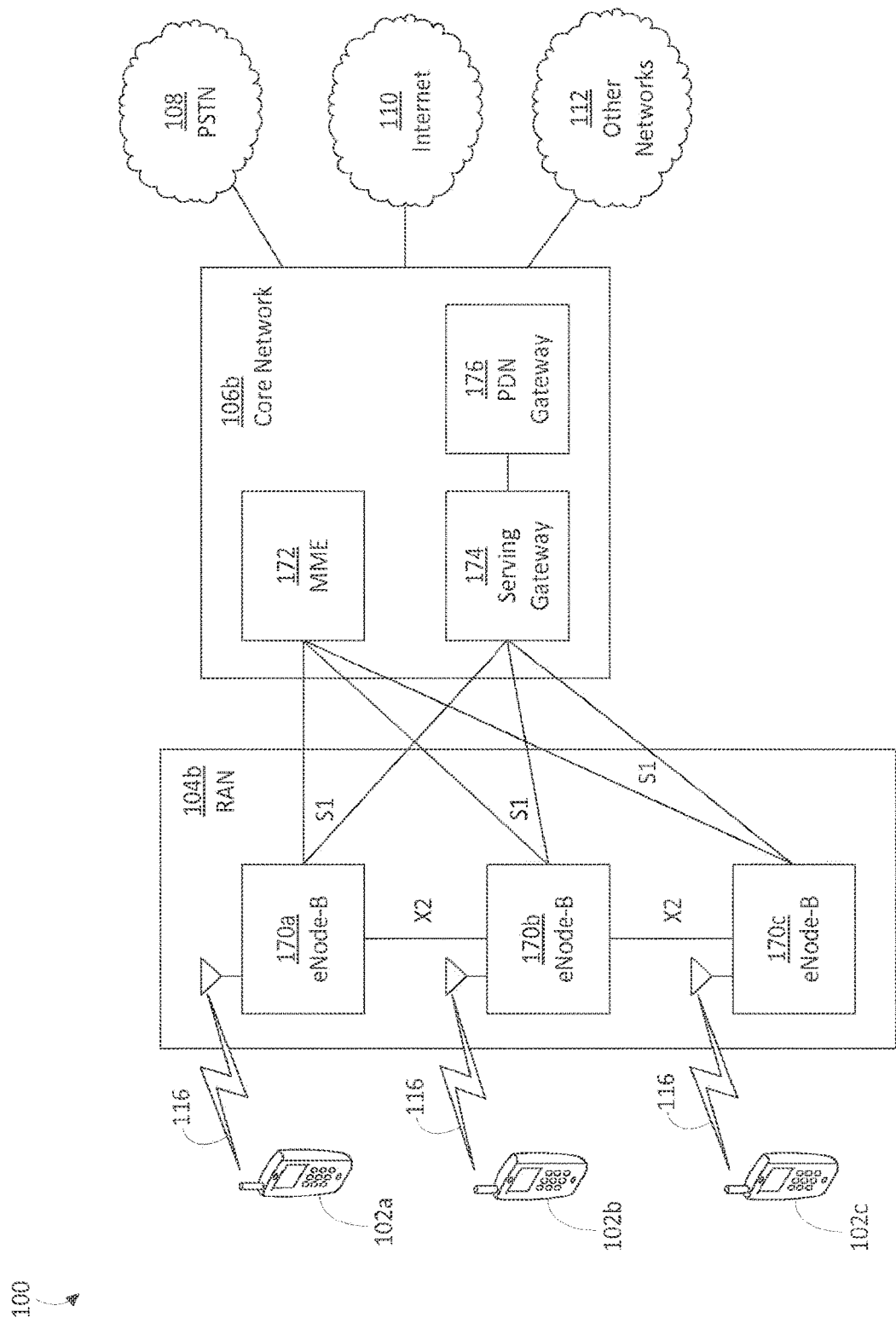
FIG. 1D depicts a system diagram of an example radio access network and an example core network that may be used within the communications system illustrated in FIG. 1A.

FIG. 1D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 170a, 170b, 170c, though it should be appreciated that the RAN 104b may include any number of eNode-Bs while remaining consistent with an embodiment. The eNode-Bs 170a, 170b, 170c may each include one or more transceivers for communicating with the WTRUs 102a, 102b, 102c over the air interface 116. In one embodiment, the eNode-Bs 170a, 170b, 170c may implement MIMO technology. Thus, the eNode-B 170a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network 106b shown in FIG. 1D may include a mobility management gateway (MME) 172, a serving gateway 174, and a packet data network (PDN) gateway 176. While each of the foregoing elements is depicted as part of the core network 106b, it should be appreciated that any one of these elements may be owned and/or operated by an entity other than the core network operator.

The MME 172 may be connected to each of the eNode-Bs 170a, 170b, 170c in the RAN 104b via an S1 interface and may serve as a control node. For example, the MME 172 may be responsible for authenticating users of the WTRUs 102a, 102b, 102c, bearer activation/deactivation, selecting a particular serving gateway during an initial attach of the WTRUs 102a, 102b, 102c, and the like. The MME 172 may also provide a control plane function for switching between the RAN 104b and other RANs (not shown) that employ other radio technologies, such as GSM or WCDMA.

The serving gateway 174 may be connected to each of the eNode Bs 170a, 170b, 170c in the RAN 104b via the S1 interface. The serving gateway 174 may generally route and forward user data packets to/from the WTRUs 102a, 102b, 102c. The serving gateway 174 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 174 may also be connected to the PDN gateway 176, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 1E:
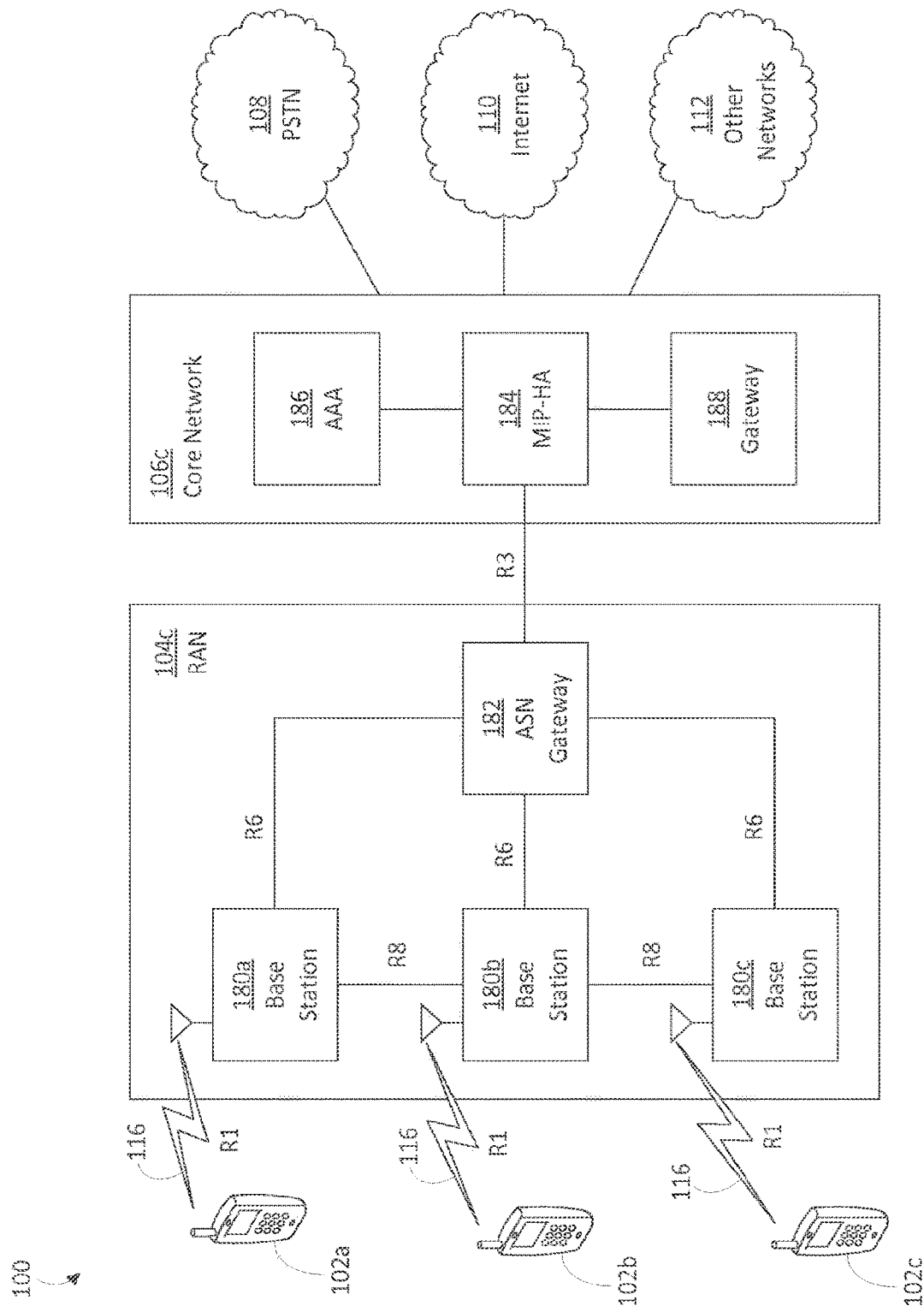
FIG. 1E depicts a system diagram of an example radio access network and an example core network that may be used within the communications system illustrated in FIG. 1A.

FIG. 1E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, 102c over the air interface 116. As described herein, the communication links between the different functional entities of the WTRUs 102a, 102b, 102c, the RAN 104c, and the core network 106c may be defined as reference points.

As shown in FIG. 1E, the RAN 104c may include base stations 180a, 180b, 180c, and an ASN gateway 182, though it should be appreciated that the RAN 104c may include any number of base stations and ASN gateways while remaining consistent with an embodiment. The base stations 180a, 180b, 180c may each be associated with a particular cell (not shown) in the RAN 104c and may each include one or more transceivers for communicating with the WTRUs 102a, 102b, 102c over the air interface 116. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN Gateway 182 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, 102c may establish a logical interface (not shown) with the core network 106c. The logical interface between the WTRUs 102a, 102b, 102c and the core network 106c may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 184, an authentication, authorization, accounting (AAA) server 186, and a gateway 188. While each of the foregoing elements is depicted as part of the core network 106c, it should be appreciated that any one of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired or wireless networks that are owned and/or operated by other service providers.

Although not shown in FIG. 1E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

One or more example described herein may provide apparatuses, functions, procedures, processes, execution of computer program instructions tangibly embodying a computer readable memory, and operation of techniques for communication (e.g., a machine type communication (MTC)) in a network including, for example, power management such as managing reachability of a device (e.g., in or associated with the network) including activating and/or deactivating a power saving mode (PSM) and/or controlling congestion.

For example, example methods, procedures, mechanisms and techniques for providing or triggering power saving mode (PSM) functionality in a device such as a WTRU (e.g., at least one device or WTRU), a group of devices or WTRUs or a subset of the group of devices or WTRUs may be provided and described. In an example, the PSM may be provided or triggered (e.g., activated and/or deactivated) in response to a request or message such as an application layer request to set one or more predetermined PSM settings where, for example, the request or message (e.g., trigger) may originate from one or more application servers (APs) directed to a core network (e.g., such as a cellular network or the network 100 described herein). For example, an interface configured for enabling the application server to request enabling and disabling PSM functionality may be provided between the AP and the core network that may be used to provide the request or message.

Moreover, as discussed herein, currently, there may be a lack of a procedure or technique for allowing, for example, an AS to force or put a device or WRTU, or group of devices or WTRUs or a subset of the group of devices WTRUs, into a power saving mode and/or from preventing a device or WTRU. The example methods, procedures, mechanisms, and techniques described herein may provide such an ability for an AS to place a device or WTRU into a power saving mode and/or prevent a device or WTRU from entering or going into a power saving mode.

Further, example methods, procedures, mechanisms and techniques for controlling congestion are described.

Machine type communication (MTC) may be configured to provide application layer support for an application server by defining an interface disposed between the application server and a core network. The interface may be configured for enabling the application server to request enforcement of one or more rules and/or functions among at least one wireless transmit receive units, a group of WTRUs or a subset of the group of WTRUs.

In examples herein, with respect to enforcing group based congestion control, there may be a lack of a procedure or technique to allow application layer interaction between an application server (AS) and a core network (e.g., a cellular network) such as those networks specified by 3GPP (e.g., long term evolution (LTE), LTE-Advance, Global System for Mobile communications radio access network (GERAN), Global System for Mobile communications (GSM), Enhanced Data rates for GSM Evolution (EDGE), GSM EDGE (GERAN) and the like). For example, currently, there may be a lack of a procedure or technique to allow an AS to request that a WRTU (e.g., or a device), or group of WTRUs or a subset of the group of WTRUs (e.g., or devices), back off an attempt to obtain services from the AS. Similarly, there may be a lack of a procedure or technique to allow an AS to request that a WRTU, or group of WTRUs, or a subset of the group of WTRUs, resume obtaining services from the AS. The example methods, procedures, mechanisms, and techniques described herein may provide such an ability for an AS to request a device or WTRU back off an attempt to obtain services therefrom and/or to request or obtain services therefrom.

According to example herein, rules and/or policies may be used (e.g., as defined by, for example, the third generation partnership program (3GPP)) to enforce group based congestion. Congestion control among one or more WTRUs (e.g., a device or WTRU), or a group of WTRUs, may be implemented at several layers in either the control plane or user plane in an advanced cellular network, such as those networks specified by 3GPP. However, such group based congestion 3GPP proposals fail to provide functionality which would allow an interaction between an application server (AS) and a 3GPP cellular network. For example, as described herein, a method (e.g., procedure, technique, or a mechanism) which would allow the AS to interact with the 3GPP cellular network to inform it about service unavailability, or service resumption, which may be used by the cellular network to enforce a back off mechanism, or terminate a back off mechanism, respectively, may be provided.

Congestion control may be utilized in an example or scenario in which an application server (AS) (e.g., a service provider for a group of WTRUs configured for machine type communication (MTC)) may be temporarily down, rendering particular services unavailable to the WTRUs (e.g., or devices). More specifically, in such a congestion control example, the WTRU or group of WTRUs may be deployed to obtain services from the temporarily downed AS, or may be configured to send data to the temporarily downed AS. For example, a metering system that may include a plurality of WTRUs (e.g., deployed by a company) and may be configured such that each WTRU may attempt to access the system with the objective of establishing a connection with the AS (e.g., without knowledge that service is momentarily not in service). Since the event of unavailability may be unknown to the WTRU, or group of WTRUS, the WTRU may make multiple, futile re-attempts to access the AS in the hope of successfully establishing a connection with the AS. However, by doing so, the WTRU or group of WTRUs (e.g., where the group may include hundreds, thousands, and/or the like of WTRUs) may unnecessarily send signaling that may be directed at the system. Such a signaling may cause congestion in the system. In an example, applying congestion control in the above described scenario may, for example, avoid signaling for a WTRU and/or among WTRUs, which may thereby reduces power consumption of the WTRU or WTRUs, may avoid decreasing the network capacity, may reduce potential sources of interferences in the network, and/or the like.

Figure 1F:
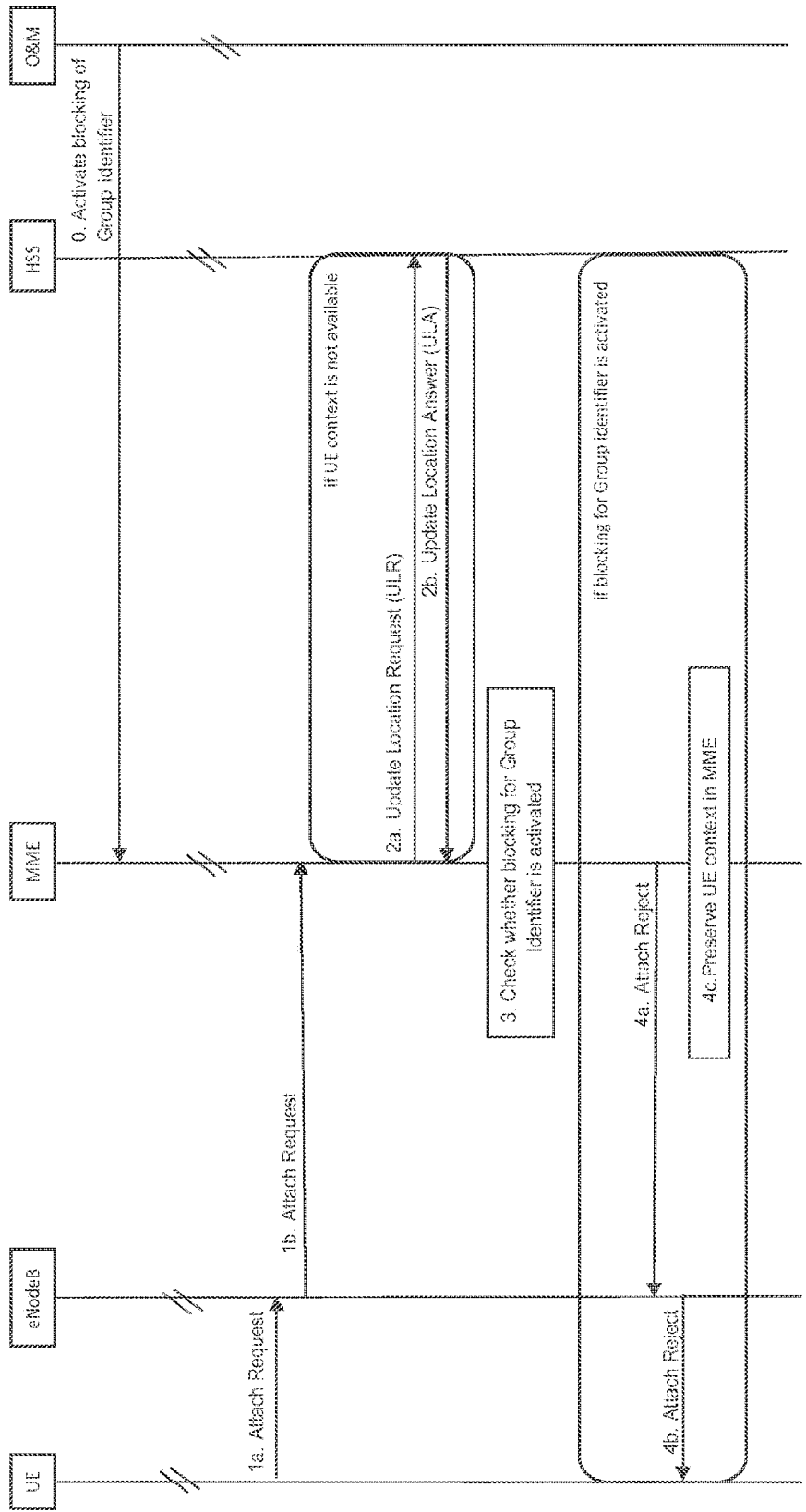
FIG. 1F illustrates a flow diagram of an example of an Attach request procedure when blocking a group of identifier is activated.

FIG. 1F provides an illustrative example of congestion control introduced into a network such as a cellular network by way of a policy such as a WTRU or group based policy set by an operator in an Operations, Administration, Maintenance (OAM) or Operations & Maintenance (O&M). That is, a policy such as a group based policy which may provide, for example, information related to the availability of an AS for normal service or information, indicating that the AS may have resumed providing normal service (e.g., server temporarily unable or service resumed). The OAM or O&M policy such as the group based policy may, for example, be made available to a core network element in an evolved packet core (EPC), such as a mobility management entity (MME) (e.g., as shown at 0), a serving general packet radio service (GPRS) support node (SGSN) (not shown), or a mobile switching center (MSC) visitor location register (VLR) (not shown), and/or the like. A policy such as a group based policy may be configured to be implemented on a device or WTRU or UE such as a WTRU, a group of WTRUs or a subset of the group of WTRUs when each WTRU attempts to access the system (e.g., during an "Attach Request") as shown in FIG. 1F. In such an example, the MME 15 may determine (e.g., at 3) whether or if the WTRU may be part of a "blocked" group specified by OAM or O&M in the policy such as the group based policy (e.g., by way of a group identifier). If yes (e.g., the WTRU may be part of the "blocked" group), the MME may inform the WTRU to back off (BO). For example, the MME may internally activate blocking of evolved packet system (EPS) mobility management (EMM) signaling for WTRUs with a particular group identifier. Also, as shown in FIG. 1F, if blocking may be activated, the MME may also send (e.g., as shown via a eNode B) an Attach Reject to the WTRU, including a mobility management back off timer (e.g., at 4a-4c). The MME may be configured to store the WTRU's context in order to avoid downloading the WTRU's context again in case of a future Attach Request. Further, as shown in FIG. 1F, if a context of a WTRU may not be available, the MME may send an update location request (ULR) to a HSS in the core network, which in turn may respond or send to the MME an update location answer (ULA).

According to examples herein, a WTRU, group of WTRUs or subset of the group of WTRUs may be configured to interact between the application layer of a 3GPP cellular network and an application server (AS). An AS may be configured to provide procedures and techniques for Congestion Mitigation of a WTRU or one or more WTRUs in the network. For example, a network node may be configured to interact between a network (e.g., a 3GPP cellular network) and an application server (AS) to provide procedures and techniques for Congestion Mitigation. An interface may be configured between the network and the AS such that the interface may be used or provided to convey a request to apply congestion control or to terminate congestion control of a WTRU, group of WTRUs or subset of the group of WTRUs. According to an example, the interface may be a middle node, an intermediate node, a gateway function between the network or one or more components thereof and the AS, and/or a direct interface may be configured between the network and/or one or more components thereof and the AS. For example, the interface may be an intermediate node such as a function (e.g., a Service Capability Exposure Function (SCEF) and/or an inter-working function (IWF)) that may be located between the network (e.g., the core network or components thereof) and the AS. In examples, the interface may be an internet protocol (IP) interface. The interface (e.g., IWF and/or SCEF and/or the like) may be configured to apply congestion control (e.g., a back off (BO) method, mechanism, and/or the like that may be applicable to a particular WTRU or a group of WTRUs upon the request from an AS and/or enabling and/or disabling of power savings mode and/or control of power settings for a WTRU by an AS as described herein.

Figure 2:
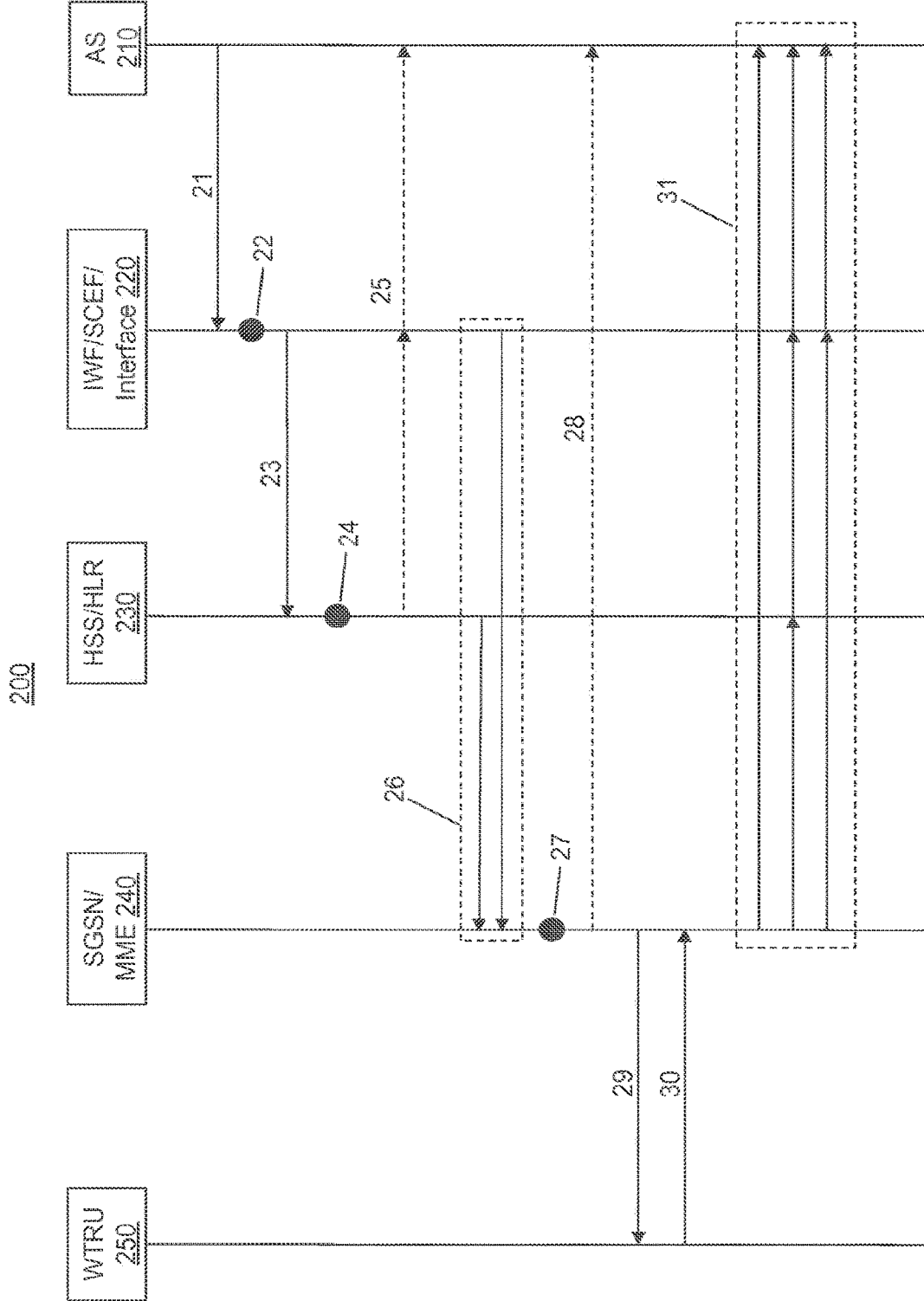
FIGS. 2-3 illustrates a flow diagram of an example of an interface (e.g., IWF/SCEF) and method configured for communicating with the application layer of a 3GPP cellular network and an application server according to one or more examples herein.

FIG. 2 illustrates a flow diagram of an example of an inter-working function (IWF) and/or Service Capability Exposure Function (SCEF) and/or interface 220 and/or method 200 that may be configured for communicating with the application layer of a 3GPP cellular network and an application server. As shown in FIG. 2 an application server (AS) 210 may be provided which may be one or more application server networks (APNs) provided by a third party company who obtains a subscription from a network operator to provide general or specific services to WTRUs in the network. The AS 210 may be disposed such that it may communicate with the application layer of a core network such as an evolved packet core (EPC) network by way of or using IWF/SCEF/interface 220. The IWF/SCEF/interface 220 may be configured to communicate and/or may communicate with (e.g., may be in communication with) a home subscriber service (HSS) and/or a home location registry (HLR) 230 via a connection or interface. As shown, in an example, the HSS/HLR 230 may be further configured to communicate with serving general packet radio service (GPRS) support node (SGSN) or a mobility management entity (MME) and/or a mobile switching center (MSC) 240 and/or a visitor location register (VLR) (not shown). The MME or SGSN 240 may be configured to act as a serving node for a WTRU or device 250 (e.g., one or more WTRUs). In an example, the IWF 220 may interface directly with SGSN/MME 240.

Figure 4:
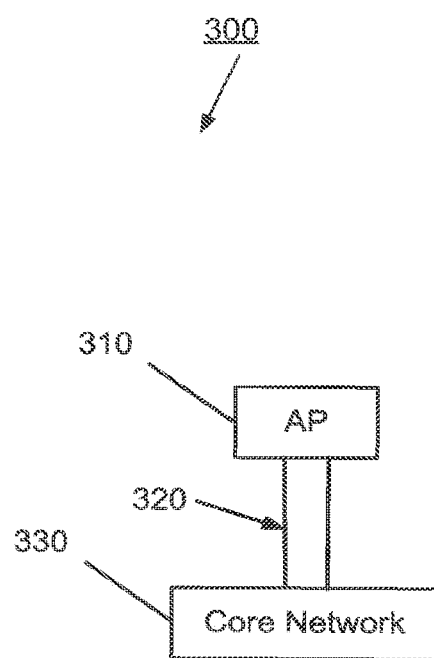
FIG. 4 illustrates an example of an interface configured to communication with the application layer of a core network and an application server.

FIG. 4 illustrates an example of an interface 320 configured to communicate with a core network (e.g., such as the HSS/HLR, SGSN/MME, VLR, and/or the like and/or the application layer of a core network) and an application server such as the AS 210 (shown in FIG. 2) and/or AS 310. As shown in FIG. 4, the AS 310 may be disposed such that it may communicate to the application layer of a core network 330 such as an evolved packet core (EPC) network by way of an interface or connection 320.

Figure 3:
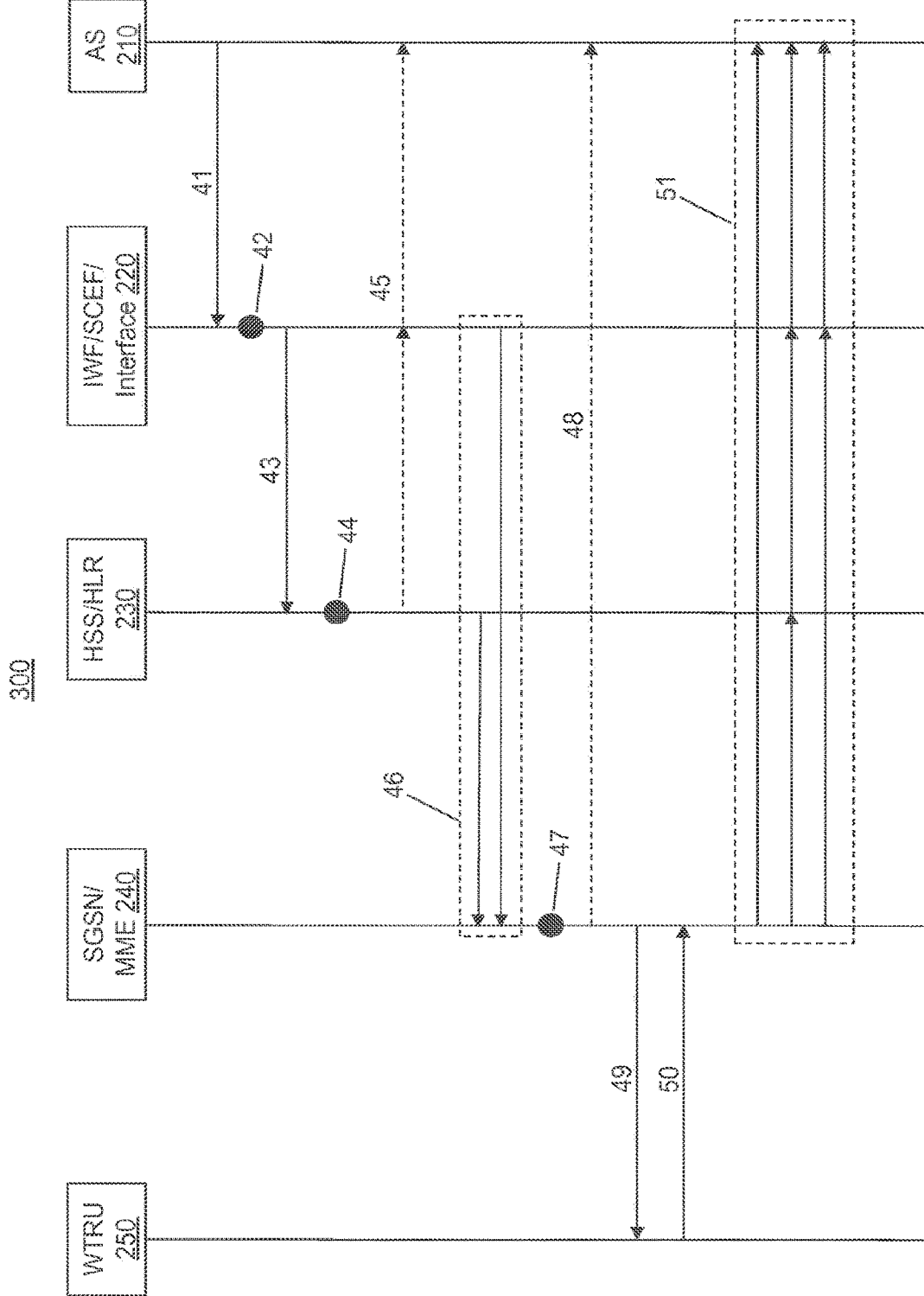

As shown (e.g., in FIG. 2), the AS (e.g., 210 and/or 310) may be configured to send and/or may send (e.g., at 21) a request to apply congestion control to a particular WTRU, a group of WTRUs or subset of the group of WTRUs. The AS may be configured to send and/or may send a plurality of back off parameters, together with the request for congestion control, to a core network entity (e.g., via the interface or connection as shown in FIG. 3) disposed in a core network, such as an evolved packet core or it may be configured to send and/or may send (e.g., at 21) the request and plurality of back off parameters to the IWF/SCEF/interface (e.g., as shown in FIG. 2). The plurality of back off parameters (e.g., sent at 21) may include, for example, one or more group identifiers (IDs), one or more time intervals for which the WTRU or group of WTRUs should be backed off and/or one or more time intervals for which a request to back off may be valid. The AS may be configured to send and/or may send (e.g., at 21) a message or information element, together with the request for congestion control and/or a plurality of back off parameters. The message or information element may include a reason for enabling or disabling the request for congestion control (e.g., service unavailable or service resumed), as well as other predetermined information (e.g., name of issuer, time and date stamp of request, contact information, and/or the like).

The IWF/SCEF/interface (e.g., 220 and/or 320 and/or a network entity such as the same or another network entity and/or the AS via the interface or connection) may be configured to receive and/or may receive such parameters, information, message, and/or the like (e.g., as described above) from the AS (e.g., at 21). In one example, IWF/SCEF/interface (e.g., at 22) may store such received parameters, information, message, and/or the like (e.g., received at 21). The IWF/SCEF/interface may be configured to verify and/or may verify (e.g., at 22) itself and/or with a core network entity, for example, a home subscriber service (HSS) and/or home location register (HLR) (e.g., 230 and/or a component in the network 330) to determine if the request (e.g., sent and received at 21) may be permitted (e.g., authorized) for the AS. For example, the IWF/SCEF/interface may verify or determine if or whether the AS may be permitted to make such a request (e.g., whether it may be allowed to make the request as indicated by a service layer agreement (SLA) and/or may be allowed by the core network) and/or whether the request or message may not include the proper format and/or information or parameters to process (e.g., authorize) such a request. As described herein, the IWF/SCEF/interface may provide a message or response (e.g., with a cause), for example, if the request (e.g., sent and received at 21) from the AS may not be verified and/or authorized as described herein (e.g., at 25 and/or as part of 31).

Further, in one or more examples, the IWF/SCEF/interface may be configured to generate or provide and/or may generate or provide (e.g., at 22) an application server identifier (ID) and a WTRU identifier, a WTRU group identifier (ID), or a WTRU sub group identifier (ID) relevant to the WTRU, or group of WTRUs, and/or any other suitable identifier (e.g., such as a reference identifier associated with the IWF/SCEF/interface) which may be the target of the AP's request for congestion control (e.g., and which may be stored at 22 in one example). The IWF/SCEF/interface (e.g., and/or a network entity via the interface or connection) may be configured to provide and/or may provide or send (e.g., at 23) the plurality of back off parameters and the message or information element received from the AS (e.g., at 21), or a subset of information included in the plurality of back off parameters and the message or information element, and/or the identifiers (IDs) to a core network entity (e.g., such as the HSS/HLR 230 as shown).

A core network entity (e.g., HSS/HLR 230 and/or the core network entity 330) may be configured to receive and/or may receive (e.g., at 23) the request and may be configured to verify and/or may verify or determine (e.g., at 24) if or whether the request for congestion control received from the AS (e.g., via the IWF/SCEF/interface) may be authorized. For example, the core network entity (e.g., 230 and/or 330), may examine the message or request including one or more of the identifiers that may be included therein and/or one or more parameters to determine whether the identifiers may be associated with identifiers for which the request may be authorized (e.g., the application identifier that may be associated with the AP may be permitted to make the request to the core network and/or the WTRU based on the WTRU identifier may be permitted to apply congestion control and/or may be controlled by the AP) and/or whether one or more of the included parameters and/or information may be acceptable (e.g., may be below a threshold and/or within a range) to perform congestion control. The core network entity (e.g., the HSS/HLR) may be configured to store the identifiers and/or parameters or other information that may be received in the request and/or that may be verified (e.g., at 24).

The core network entity (e.g., HSS/HLR 230 and/or the core network entity 330) (e.g., upon authorization) may also be configured to provide and/or may provide or send (e.g., to the IWF/SCEF/interface 220 and/or the AS 210, for example, as part of 25 and/or 31) an address of the core network (CN) node that may be serving the WTRU, or group of WTRUs, or subset of the group of WTRU. The CN node may, for example, be a mobility management entity (MME), a serving general packet radio service (GPRS) support node (SGSN), or a mobile switching center (MSC) visitor location register (VLR) and the like. The CN node may provide several addresses, for example, if (1) a pool of MMEs that may be designated to one or more user equipment(s) (UEs) may be in an LTE system, or (2) a pool of SGSNs designated to one or more mobile stations (MSs) in a global system for mobile communications (GSM) enhanced data rates for GSM evolution (EDGE) radio access network/universal terrestrial radio access network (UTRAN) system.

In an example (e.g., if or when the core network entity (e.g., HSS and/or HLR) may not authorize, for example, based on the verification or determination (e.g., at 24) such as when the parameters may not be acceptable and/or the request not permitted based on one or more of the identifiers, the request for congestion control (e.g., at 24)), a response may be sent to the AS (e.g., by way of the IFW/SCEF/interface 220 as shown, for example, by dashed arrow 25 and/or as part of a response at 31 in FIG. 2 and/or via an interface or connection as shown in FIG. 3) indicating the rejection of the request along with a cause code to describe the reason why the request was denied. In one example, if or when the request to the core network entity (e.g., HSS/HLR) may be authorized (e.g., at 24), the IWF/SCEF/interface (e.g., and/or a network entity via the interface or connection) may be configured to respond and/or may provide the response to the AS with an indication that the request has been authorized (e.g., at 25 and/or as part of the response at 31).

As shown, the IWF/SCEF/interface (e.g., and/or the a network entity and/or the AS via the interface or connection) and/or the core network entity (e.g., the HSS/HLR) may be configured to forward and/or may forward or send (e.g. at 26) the request for congestion control to a serving node(s) (e.g., MME and/or SGSN, and/or MSC/VLR) that may be received thereby (e.g. at 26). The IWF/SCEF/interface (e.g., and/or a network entity and/or the AS via the interface or connection) and/or the core network entity (e.g., the HSS/HLR) may be configured to identify and/or may determine or identify (e.g., as part of 22 and/or 24 and/or separate therefrom) a WTRU, a group of WTRUs, or subset of the group of WTRUs, for which the request may be intended and to identify or to specify the time for which the request may be valid, and the requested back off time and/or any other suitable parameters that may need to be provided to the serving node to honor the request and/or initiate the request.

In an example, the serving node (e.g., the SGSN/MME 240 and/or the core network entity 330) may be configured to verify and/or may verify (e.g., accept or reject and/or authorize) the request (e.g., at 27). For example, the serving node may determine (e.g., at 27) whether or if the serving node may serve the WTRU, AS, IWF/SCEF/interface, and/or the like (e.g., based on the one or more identifiers such as the reference identifier) that may be received and/or whether congestion control may be permitted (e.g., based on an agreement). The serving node may be configured to reject and/or may reject a request by sending a response (e.g., as shown at 28 by the dashed line in FIG. 2 and/or as part of 31), for example, if the serving node may not serve the WTRU, group of WTRUs, or subset of the group of WTRUs. The serving node may further be configured to reject a request (e.g., at 28 and/or 31) by sending a response, for example, if the serving node may not have context for the WTRU, or the group of WTRUs or a subset of the group of WTRUs. Such a response (e.g., at 28 and/or 31) as described herein may also include a cause. The serving node may also be configured to store and/or may store (e.g., at 27) the one or more parameters and/or information that may be part of the request (e.g., for applying congestion control), and/or the like that may be received by the serving node.

The serving node (e.g., the SGSN/MME) may be configured to respond and/or may respond or send (e.g., at 31) to the core network entity (e.g., the HSS/HLR) and/or the IWF/SCEF/interface (e.g., and/or a network entity such as another network entity) and/or the AS with an acknowledgement that a request for congestion control may have been granted and/or if the serving node may be able to apply congestion control (e.g., it may be successful and/or the information may be suitable to apply congestion control). A procedure or technique for apply applying congestion control may be initiated by a serving node (e.g., MME, SGSN, MSC/VLR or the like) such that the congestion control may be applied to an identified WTRU (e.g., 250 and/or 102*a-d*) or group of WTRUs or subset of the group as targeted by the AS. In examples (e.g., if the WTRU, group of WTRUs, or a subset of the group of WTRUs may be or may already be in connected mode), the serving node may be configured to send and/or may send a non-access stratum (NAS) message (e.g., at 29) to indicate to tell the WTRUs to back off (BO) (e.g., stop attempting to access a service on a particular AS). The NAS message may include information identifying the service or the AS for which the request may be intended. The serving node (e.g., the MME or SGSN, or MSC/VLR) may also be configured to include a BO timer. The BO timer may be received from or via the AS, the IWF/SCEF/interface, and/or the like or configured in accordance with local policies in the WTRU or the serving node.

According to examples herein (e.g., if the WTRU, group of WTRUs, or subsets of the WTRUs may be in idle mode), the serving node (e.g., the SGSN/MME 240) may be configured to page and/or may page (e.g., at 29) the WTRU (e.g., 250 and/or one or more of 102*a-d*), group of WTRUs, or a subset of the WTRUs, that may be part of the group. The WTRU may be configured to respond and/or may respond (e.g., at 30) to the page (e.g., using a Service Request (SR), Extended Service Request (ESR), Tracking Area Update (TAU), and/or the like) and the serving node may be configured to reject and/or may reject the NAS message and include a BO timer. According to an example, the serving node may reject the request received (e.g., at 30) by sending a "Reject" message (e.g., a TAU Reject if the WTRU may have sent a TAU request). Further, in examples, the serving node may reject the request, for example, if there may be congestion at the MME, the WTRU may not be known, and/or the like.

In one or more examples herein (e.g., if the WTRU, group of WTRUs or subsets of the WTRUs may be in idle mode), the serving node (e.g., the SGSN/MME 240) may be configured to wait and/or may wait (e.g., based on an adjusted to a "Periodic Update" time as the serving node may not know when the WTRU may contact it]) for the WTRU and/or WTRUs to establish a NAS connection and, for example, if or when it or they do so, the serving node may be configured to verify and/or may verify (e.g., determine) (e.g., based on an identifier of the WTRU matching an identifier of a WTRU for which BO should be applied and/or being an identifier in a group for which BO should be applied), for example, if or whether the WTRU or WTRUs may be a WTRU for which a BO should be applied and/or may be part of a group for which a BO should be applied. According to an example (e.g., if BO should be applied based on the verification (e.g., determination), the serving node may be configured to reject and/or may reject (e.g., by sending the corresponding reject message) the WTRU's NAS message (e.g., SR, ESR, TAU, and/or the like) and may include in the reject message a BO timer with a value as received from the IWF/SCEF/interface and/or a network entity, or in accordance with a local policy in the WTRU or the serving node as described herein. The serving node may be configured to identify and/or may identify (e.g., via an operator's configuration and/or based on information from when the AS contacted the serving node (e.g., received and sent at 21, 23, and 26)) the service or the AS for which the request may be intended The serving node (e.g., the SGSN/MME 240) may be configured to inform and/or may inform (e.g., in a response message (e.g., at 31)) the IWF/SCEF/interface and/or a network entity (e.g., the HSS/HLR 230) that a BO timer has been applied to a WTRU (e.g., 25) or a group of WTRUs or a subset of the group of WTRUs, for example, if or when at least one WTRU has been subject to a back off (BO) timer, a group of WTRUs, or a subset of the WTRUs in the group have been subject to the back off timer. The IFW and/or the network entity may be configured to forward and/or may forward (e.g., send) the indication of a back off of the WTRU or WTRUs to the AS (e.g., at 31). In one example, a response may be provided by the serving node to the network entity and subsequently to the IWF/SCEF/interface to the AS (e.g., at 31). It may also be provided directly and/or through the IWF/SCEF/interface as shown.

In examples herein, the AS may further be configured to re-submit and/or may re-submit another request (e.g., when the AS knows that it does not need to contact these devices for a period of time]) to extend the BO timer for a WTRU, a group of WTRUs or subset of the group of WTRUs at a predetermined time. The AS may be configured to follow and/or may follow or perform the same procedures or techniques as described herein. Furthermore, the serving node (e.g., MME, SGSN, MSC/VLR or the like) may be configured to reset and/or may reset the BO timer for the WTRU, group of WTRUs, or subset of the group of WTRUs with a value such that, for example, when at least one WTRU connects to the system, the MME may further back off the at least one WTRU in accordance with the back off timer received from the IWF.

The AS may be configured to submit and/or may submit or send a request to terminate a previously applied BO (e.g., BO timer) for a WTRU, a group of WTRUs, or a subset of WTRUs within a group. The AS may be configured to follow and/or may follow or perform the same procedures or techniques as described herein (e.g., above), except that the request may have an action that indicates, as an example, "resume service" as opposed to back off the at least one WTRU. The serving node (e.g., MME, SGSN, MSC/VLR or the like) may be configured to follow and/or may follow or perform the same procedures or techniques as described herein (e.g., above) in response to the resume service request from the AS. The serving node (e.g., MME, SGSN, MSC/VLR or the like) upon receiving the resume service request may be configured to page and/or may page (e.g., a regular paging of the WTRU that may be used by the serving node to inform the WTRU that congestion may have been lifted) the backed off WTRU, group of WTRUs, or a subset of WTRUs within a group. The page may have the effect of stopping and/or may stop a BO timer that may have been previously allocated to the WTRU, or to a group of WTRUs or a subset of WTRUs within a group.

As described herein, currently, there also may be a lack of a procedure or technique for allowing, for example, an application server (AS) to force or control a WRTU, a group of WTRUs or subset of the group of WTRUs into or out of a power saving mode (PSM) (e.g., in the 3GPP standard). However, an AS may want, desire, configure, and/or establish that a WTRU configured for machine type communication (MTC), or a group of WTRUs similarly configured, enter PSM. This may, for example, happen (e.g., the AS may want, desire, configure, and/or establish that a WTRU enter PSM), after the WTRU may report a low power level (e.g., as directed by an AS). In such an example, the WTRU may be, for example, monitoring a particular event and may periodically send reports to the AS. As such, according to examples, the WTRU may not enter PSM if not informed (e.g., a message sent or directly by a message or other signaling to the network or WTRU) to enter PSM by the AS.

Additionally (e.g., in accordance with the 3GPP standard), a WTRU may be configured to request and/or may request (e.g., by including an information element in the registration (Attach/TAU Request) messages) to enter PSM, and a network element (e.g., MME) may in response be configured to allow this operation in the WTRU. In examples (e.g., if allowed to enter PSM), the network may assign an amount of time such as an "active time" which may define the time during which the WTRU may be reachable for terminated services. The WTRU may be configured to start and/or may start a timer with a value set to that of the active time provided to the WTRU by the network. According to an example (e.g., when this timer may expire), the WTRU may be configured to deactivate its radio functions and halt an idle mode procedure. The WTRU may resume normal operation (e.g., exits PSM), for example, if or when it may have data to send or if or when its periodic registration timer may expire.

A WTRU that may be configured for PSM functionality, in examples, may use the PSM by requesting an Active Time value and may request a periodic tacking area update (TAU)/routing area update (RAU) timer value during Attach and TAU procedures. The WTRU may not request the periodic TAU/RAU timer value if it is not requesting an active time value. As specified in a 3GPP standard, the network may not allocate an active time value if the WTRU has not requested it. PSM may not have support in the circuit switched (CS) domain on the network side. Additionally (e.g., when the PSM may be activated), the WTRU might not be available for paging of mobile terminated CS services, even though the WTRU may be registered in the CS domain in one or more examples. Also, attach and TAU procedures (e.g., in accordance with a 3GPP standard) may not provide information for the Periodic TAU Time and Active Time negotiation (e.g., they may not provide the related information elements (IEs)).

Additionally (e.g., if the network may allocate an active time value), the WTRU may start or initiate the active timer and the serving node (e.g., the SGSN/MME 240) may start or initiate the mobile reachable timer with the active time value that may allocated by the network, for example, if or when transitioning from evolved packet system (EPS) connection management (ECM) (e.g., ECM_CONNECTED) to ECM_IDLE. In examples (e.g., if or when the active timer may expire), the WTRU may deactivate its access stratum functions and may enter PSM. In PSM, due to deactivation of access stratum functions, the WTRU may stop an idle mode procedure, but may continue to run any non-access stratum (NAS) timers that may apply (e.g., the periodic TAU timer). According to an example, the WTRU may be configured to resume and/or may resume access stratum functions (e.g., the WTRU may have signaling or user data to be sent, for example, before the periodic timer expires) and idle mode procedures before the periodic TAU timer expires for performing the applicable periodic TAU procedures. The WTRU may be configured to resume and/or may resume or perform idle mode procedures and access stratum functions such as at any time while in PSM (e.g., for mobile originated communications). Further, timers and conditions that remain valid during power-off (e.g., for NAS-level back-off) may be applied the same way during PSM.

According to an example (e.g., when the mobile reachable timer may expire and the serving node (e.g., the SGSN/MME 240) may be configured to store and/or may store an active time for the WTRU), the MME may determine and/or know that the WTRU may have entered PSM and may not available for paging (e.g., due to the expiration of the timer associated with the active time). The serving node may further handle the mobile reachable timer and the availability for paging (e.g., including resetting it and/or modifying or changing it to another value]). Further in examples, on the WTRU side, the PSM may comply with some substates of EMM_REGISTERED (e.g., may be in accordance to some Mobility Management states such as being Registered, however, not reachable). In such an example, the MME may consider and/or treat the WTRU to be EMM_REGISTERED, but not reachable. The WTRU's access stratum functions may be considered as deactivated during PSM in one or more examples.

As such, in examples, the WTRU may enter PSM (e.g., may activate PSM) if it may request an active time. However, according to examples, there may not be a way for the network to "force" a WTRU to adopt PSM and/or to activate or deactivate it Systems and/or methods described herein (e.g., below) may be provided and/or used, for example, to force a WTRU (e.g., such as WTRU 250 and/or 102*a-d*), a group of WTRUs, or subset of the group of WTRUs to enter PSM (e.g., including activating and/or deactivating PSM). For example, the systems and/or methods may force the WTRU and group of WTRUs to activate PSM, either due to local policies included in a network entity (e.g., MME) or WTRU, or due to a request from the AS and/or to deactivate PSM (e.g., in response to a request from an AS such as AS 210 and/or 310).

For example, the AS (e.g., 210 and/or 310) may be configured to enable and/or disable and/or may enable and/or disable (e.g., control) a power savings mode functionality of at least one WTRU (e.g., 250 and/or one or more of 102*a-d*) in a network (e.g., the core network) including activating and/or deactivating the PSM. According to an example, the AS may be configured to determine and/or may determine (e.g., by providing information to the serving node such that the serving node may use the information such as a time for the WTRU to be monitored to deactivate/stop and/or activate start PSM) that a WTRU (e.g., 250 and/or one or more of 102*a-d*), a group of WTRUs, or subset of the group of WTRUs, should start or stop using PSM functionality depending on certain decisions at the application layer (e.g., by the AS). For example, a WTRU in PSM may be more suitable for mobile-originated (MO) traffic. However, if the AS wants to reach a WTRU, a group of WTRUs, or subset of the group, it may be useful for the AS to change the settings of the WTRU or WTRUs such that PSM may no longer be used by the WTRU or WTRUs. On the other hand, the AS may be configured to consider, may consider and/or may determine if it may be more appropriate or suitable for a WTRU, group of WTRUs, or subset of the group of WTRUs, to operate in a model suitable for MO traffic, and hence may request the 3GPP system to activate PSM for the WTRU or WTRUs (e.g., the WTRU may be a MTC device may report something once in a while, i.e. no traffic is expected in the other direction). A benefit of the systems and/or methods described herein (e.g., using the 3GPP system) enforcing, for example, PSM functionality of a WTRU or among WTRUs, may include scalability. For example, it may be more scalable in the systems and/or methods described herein than having the AS use higher layer procedures or techniques to change PSM settings in a WTRU or individual WTRUs (e.g., especially for a group that includes a large number of WTRUs).

In such systems and/or methods, according to an example, the IWF/SCEF/interface (e.g., 220 or 320) may be configured between an AS and an application layer (e.g., the core network) for enabling and/or disabling PSM functionality of at least one WTRU (e.g., 250 and/or at least one of 102*a-b*). Further, in examples (e.g., as described herein above), the IWF/SCEF/interface may be configured for conveying and/or may convey (e.g., send) a request to apply congestion control or stop congestion control to a WTRU, to a group of WTRUs, or to a subset of the group of WTRUs. The IWF/SCEF/interface may also be configured for requesting activation and/or deactivation of PSM functionality in at least one WTRU. For example, an AS may be configured to submit a request to the network or core network (e.g., the 3GPP system) to "activate PSM" or "deactivate PSM" to a WTRU, a group of WTRUs, or a subset of the group of WTRUs. This request may be sent to the IWF/SCEF/interface, in an example, and the information therein may be provided to the core network such as the network entity (e.g., HSS/HLR 230) and/or the serving node (e.g., SGSN/MME) and/or subsequently to the WTRU (e.g., 230) as shown in FIGS. 2-4. The AS can be configured to include an active time that is used in conjunction with PSM function and interface or connection (e.g., that may be sent to the core network or an entity thereof.

The systems and/or methods described herein for enforcing congestion control by way of a back off mechanism applied to a WTRU, a group of WTRUs, or subset of WTRUs, may for example, be employed utilizing a similar call flow or sequence of events described above and shown in FIG. 2 or FIG. 4, except that the request sent from the AS to the 3GPP cellular network may be to enable and/or disable PSM (e.g., activate or deactivate PSM and/or the reachability of the WTRU) and not a request to back off a service request, or a request to resume service. This may be illustrated in FIG. 3 (e.g., which may be similar to FIG. 2 exempt the information provided and sent may include one or more parameters including a timer for a PSM and/or reachability of the WTRU as described rather than a BO request or parameters or information associated therewith for congestion control). For example, FIG. 3 illustrates a system and method 300 for enabling and/or disability PSM including activating or deactivating PSM (e.g., modifying the reachability of the WTRU) according to one or more examples, herein). The systems and/or methods described herein (e.g., and in an example shown in FIGS. 3 and 4) may also identify the targeted WTRU, group of WTRUs, or subset of WTRUs, and the request (from the AS to the 3GPP layer) may also include a value to be used as the active time for PSM.

The AS (e.g., 210 and/or 310) and network (e.g., 3GPP cellular network and/or entities thereof including 230, 240, and/or 330) may be configured to enforce and/or may enforce one or more PSM settings applicable to a WTRU, a group of WTRUs, or a subset of the group of WTRUs. The PSM settings may include either "activation of PSM" or "deactivation of PSM." In an example, the PSM settings may be enforced by the serving node making a decision on whether to activate or deactivate PSM and/or enable or disable PSM or the reachability of the WTRU based on the timer that may be sent as part of the request or the parameters associated therewith. A serving node(s) (e.g., MME and/or SGSN, and/or MSC/VLR) may be configured to receive and/or may receive a request (e.g., from the AS and in an example at 46 as shown in FIG. 3 from the AS via the IWF/SCEF/interface 250 at 41 and the network entity or HSS/HLR 230 at 43) to enforce a PSM setting (e.g. activate PSM) for a particular WTRU, specified group of WTRUs, or a subset of the group of WTRUs. A serving node(s) (e.g., MME and/or SGSN, and/or MSC/VLR) may be configured to provide and/or may provide an active timer (e.g., may send the timer to the WTRU in response to the request from the AS to enforce the PSM setting).

According to examples herein, enforcement of a PSM setting may depend on a particular deployment example. For example, an AS may be configured to include and/or may include an indication (e.g., a parameter in a request such as the Submit Request message] that may be sent at 41) whether the serving node(s) (e.g., MME and/or SGSN, and/or MSC/VLR) should or should not take a predetermined proactive measure. The AS may also be configured to include and/or may include a time during which proactive measure may not be employed. The serving node(s) (e.g., MME and/or SGSN, and/or MSC/VLR) may be configured to start and/or may start a timer (e.g., at 47 in FIG. 3) with a predetermined value and, when this timer expires, the serving node may take and/or perform a proactive measure or action (e.g., as described below and at 47). The proactive measure or action may include stopping or modifying the PSM settings. For example, if there may not be an indication of a proactive measure or action, the serving node(s) MME and/or SGSN, and/or MSC/VLR) may be configured to wait and/or may wait (e.g., at 47) until or for a WTRU's next tracking area update (TAU) to enforce the PSM setting accordingly. In an example (e.g., if a proactive measure or action may be invoked or if the timer that guards the proactive measure or action may expire as described above), the serving node may take proactive measures and/or actions (e.g., as described above) to enforce the PSM settings (e.g., at 47 including contacting and/or sending a update to the PSM settings for the WTRU to invoke, for example, at 49).

Further, the AS may be configured to request and/or may send a request (e.g., as part of 41 in FIG. 3 and/or separately) to the network for the network (e.g., MME) send an indication to the AS, for example, when a WTRU exits PSM (e.g., for purposes of signaling or sending or receiving data).

Additionally, a WTRU may be configured to request and/or may request (e.g., may send a request) for a PSM setting (e.g., at 50 in one example or separately). A serving node(s) MME and/or SGSN, and/or MSC/VLR) may be configured to respond and/or may respond (e.g., may send a response with the PSM setting) (not shown in FIG. 3) to the request thereof (e.g., to the request for the PSM setting). For example, a WTRU may be configured to send a track area update (TAU) message to the serving node(s) (e.g., MME and/or SGSN, and/or MSC/VLR) to request a PSM setting. In an example, the PSM setting that may be requested may be done so to replace and/or in response to a preconfigured setting in the WTRU.

The serving node may be configured to verify and/or may verify or determine (e.g., as part of 47) whether or if a WTRU may be a WTRU for which a PSM setting (e.g., such as activation and/or deactivation and/or enabling or disabling) should be sent including whether the WTRU may be in a group of WTRUs for which a PSM setting may be applied. For example, the serving node may be configured to determine (e.g., as part of 47) whether the WTRU may be a WTRU for which a MME has received a request to enforce a predetermined PSM setting and/or a WTRU that belongs to a group for which a MME has received a request to enforce a predetermined PSM setting. A serving node may be configured to verify and/or may verify (e.g., as part of 47) if a WTRU may be a WTRU may be a WTRU for which to apply parameters or rules and/or may be part of a group regardless of whether the PSM may be authorized for the WTRU.

According to additional examples, a serving node may be configured to verify and/or may verify or determine whether (e.g., as part of 47) or if a PSM setting occurs for a WTRU, a group of WTRUs or a subset of the group of WTRUs targeted by an AS. According to an example, such a verification and/or determination may be made using a request form the AS. For example, the serving node may receive a request from the AS to enable and/or disable (e.g., activate and/or deactivate) PSM settings for a WTRU and the serving node may save such an indication for the WTRU such that it may verify and/or determine whether to enable and/or disable PSM in the WTRU using the indication, for example, when the WTRU may request to enter PSM.

The AS may be configured to send and/or send the request for modifying PSM and/or WTRU reachability by way of an interface and/or a network entity as described herein and shown in FIG. 3 and described with respect to FIG. 2 for congestion control except the parameter or information (e.g., a timer or active timer) or a PSM setting in the request being associated with PSM and/or WTRU reachability rather than congestion control or a back off timer. Further, the serving node may respond via the interface and/or the network entity as described herein and shown in FIG. 3. Non-limiting examples of an interface may include a middle node, an intermediate node, an IWF, a SCEF, a gateway function, and/or the like.

For example, as described herein, the AS (e.g., 210 and/or 310) may be configured to send and/or may send (e.g., at 41) a request such as the submit request to enable and/or disable PSM and/or one or more PSM settings (e.g., including a reachability of a WTRU or a time for which the WTRU may remain reachable by the AS). The request may include the PSM settings to be set, one or more parameters and/or information associated with PSM and/or reachability, and/or the like including the timer or active time timer for which the WTRU may remain reachable as described herein. AS shown the request may be sent to the IWF/SCEF/interface (e.g., 220 and/or 320) and received thereby (e.g., at 41).

In one example, IWF/SCEF/interface (e.g., at 42) may store such received parameters, information, message, and/or the like in the request (e.g., received at 41) including the timer or active time. Further, the IWF/SCEF/interface may be configured to verify and/or may verify (e.g., at 42) the request as described herein (e.g., with respect to 22 in FIG. 2). For example, the IWF/SCEF/interface may be configured to verify and/or may verify (e.g., at 42) itself and/or with a core network entity. for example, a home subscriber service (HSS) and/or home location register (HLR) (e.g., 230 and/or a component in the network 330) to determine if the request (e.g., sent and received at 41) may be permitted (e.g., authorized) for the AS. For example, the IWF/SCEF/interface may verify or determine if or whether the AS may be permitted to make such a request (e.g., whether it may be allowed to make the request as indicated by a service layer agreement (SLA) and/or may be allowed by the core network) and/or whether the request or message may not include the proper format and/or information or parameters to process (e.g., authorize) such a request including whether the active timer or timer may be valid or within a range. As described herein, the IWF/SCEF/interface may provide a message or response (e.g., with a cause), for example, if the request (e.g., sent and received at 41) from the AS may not be verified and/or authorized as described herein (e.g., at 45 and/or as part of 51).

Further, in one or more examples, the IWF/SCEF/interface may be configured to generate or provide and/or may generate or provide (e.g., at 42) an application server identifier (ID) and a WTRU identifier, a WTRU group identifier (ID), or a WTRU sub group identifier (ID) relevant to the WTRU, or group of WTRUs, and/or any other suitable identifier (e.g., such as a reference identifier associated with the IWF/SCEF/interface) which may be the target of the AP's request for enabling or disabling PSM and/or reachability of the WTRU (e.g., and which may be stored at 42 in one example). The IWF/SCEF/interface (e.g., and/or a network entity via the interface or connection) may be configured to provide and/or may provide or send (e.g., at 43) the PSM parameters and the message or information element received including the active time or timer from the AS (e.g., at 41), or a subset of information included in the plurality of back off parameters and the message or information element, and/or the identifiers (IDs) to a core network entity (e.g., such as the HSS/HLR 230 as shown).

A core network entity (e.g., HSS/HLR 230 and/or the core network entity 330) may be configured to receive and/or may receive (e.g., at 43) the request and may be configured to verify and/or may verify or determine (e.g., at 44) if or whether the request for enabling or disabling PSM or modifying reachability received from the AS (e.g., via the IWF/SCEF/interface) may be authorized. For example, the core network entity (e.g., 230 and/or 330), may examine the message or request including one or more of the identifiers that may be included therein and/or one or more parameters to determine whether the identifiers may be associated with identifiers for which the request may be authorized (e.g., the application identifier that may be associated with the AP may be permitted to make the request to the core network and/or the WTRU based on the WTRU identifier may be permitted to enable or disable PSM or modify reachability and/or may be controlled by the AP) and/or whether one or more of the included parameters and/or information such as the timer or active time may be acceptable (e.g., may be below a threshold and/or within a range) to enable or disable PSM or modify reachability. The core network entity (e.g., the HSS/HLR) may be configured to store the identifiers and/or parameters or other information that may be received in the request and/or that may be verified (e.g., at 44). Further, in examples, the core network entity may provide a notification to the IWF/SCEF/interface (e.g., in response to the request at 43) when the device may be reachable and/or the PSM may be enabled or disabled or settings applied to keep the WTRU active (e.g., as part of 45 and/or 51.

In an example (e.g., if or when the core network entity (e.g., HSS and/or HLR) may not authorize, for example, based on the verification or determination at 44 such as when the parameters may not be acceptable and/or the request not permitted based on one or more of the identifiers, the request for enabling or disabling PSM and/or modifying reachability (e.g., at 44)), a response may be sent to the AS (e.g., by way of the IFW/SCEF/interface 220 as shown, for example, by dashed arrow 45 and/or as part of a response at 41 and/or via an interface or connection as shown in FIG. 3) indicating the rejection of the request along with a cause code to describe the reason why the request was denied as described herein. In one example, if or when the request to the core network entity (e.g., HSS/HLR) may be authorized (e.g., at 44), the IWF/SCEF/interface (e.g., and/or a network entity via the interface or connection) may be configured to respond and/or may provide the response to the AS with an indication that the request has been authorized (e.g., at 25 and/or as part of the response at 31).

As shown, the IWF/SCEF/interface (e.g., and/or the a network entity and/or the AS via the interface or connection) and/or the core network entity (e.g., the HSS/HLR) may be configured to forward and/or may forward or send (e.g. at 46) the request for enabling or disabling PSM and/or modifying reachability to a serving node(s) (e.g., MME and/or SGSN, and/or MSC/VLR such as 240 and/or an entity in 330) that may be received thereby (e.g. at 46). The IWF/SCEF/interface (e.g., and/or a network entity and/or the AS via the interface or connection) and/or the core network entity (e.g., the HSS/HLR) may be configured to identify and/or may determine or identify (e.g., as part of 42 and/or 44 and/or separate therefrom) a WTRU, a group of WTRUs, or subset of the group of WTRUs, for which the request may be intended and to identify or to specify the time for which the request may be valid, and the requested active time or timer and/or any other suitable parameters that may need to be provided to the serving node to honor the request and/or initiate the request.

In an example, the serving node (e.g., the SGSN/MME 240 and/or the core network entity 330) may be configured to verify and/or may verify (e.g., accept or reject and/or authorize) the request (e.g., at 47). For example, the serving node may determine (e.g., at 24) whether or if the serving node may serve the WTRU, AS, IWF/SCEF/interface, and/or the like (e.g., based on the one or more identifiers such as the reference identifier) that may be received and/or whether PSM (e.g., enabling or disabling) or modifying reachability may be permitted (e.g., based on an agreement). The serving node may be configured to reject and/or may reject a request by sending a response (e.g., as shown at 48 by the dashed line in FIG. 2 and/or as part of 51), for example, if the serving node may not serve the WTRU, group of WTRUs, or subset of the group of WTRUs. The serving node may further be configured to reject a request (e.g., at 28 and/or 31) by sending a response, for example, if the serving node may not have context for the WTRU, or the group of WTRUs or a subset of the group of WTRUs. Such a response (e.g., at 48 and/or 51) as described herein may also include a cause. The serving node may also be configured to store and/or may store (e.g., at 57) the one or more parameters and/or information that may be part of the request (e.g., for applying PSM and/or reachability including the timer and/or other parameters as described herein), and/or the like that may be received by the serving node. Additionally (e.g., at 47 along with 49), the serving node may monitor the WTRU (e.g., 250) for entering connected mode as described herein and may apply the timer and/or active time (e.g., to keep the WTRU active and/or connected). In an example, as described herein, this may be applied (e.g., at 47 and 49) at each TAU/RAU procedure and/or via a TAU/RAU procedure.

Further, in embodiments, the serving node (e.g., the SGSN/MME) may be configured to respond and/or may respond or send (e.g., at 51) to the core network entity (e.g., the HSS/HLR) and/or the IWF/SCEF/interface (e.g., and/or a network entity such as another network entity) and/or the AS with an acknowledgement that a request for enabling or disabling PSM or reachability may have been granted and/or if the serving node may be able to apply such PSM settings. A proactive measure action as described herein may be initiated by a serving node (e.g., MME, SGSN, MSC/VLR or the like) such that the PSM settings and/or the reachability may be applied to an identified WTRU (e.g., 250 and/or 102a-d) or group of WTRUs or subset of the group as targeted by the AS as described herein. In examples herein, the WTRU (e.g., 250) may be receive (e.g., at 49) the information or parameters such as the active timer or time and/or the other PSM settings and may remain reachable for the duration of the active timer or until expiration of the active timer. According to one example (e.g., upon expiration of the active timer or time), the WTRU may enter PSM or a power savings mode based on the PSM settings. As such, as described herein, the serving node may trigger (e.g., at 47 and/or 49) the PSM functionality in WTRU based on the one or more PSM settings such that the PSM functionality is enabled and disabled (e.g., for the duration of the active time) based on the one or more settings received from the application server.

According to one example, a PSM setting may provide that the serving node(s) (e.g., MME and/or SGSN, and/or MSC/VLR) grant and/or refuse to grant PSM usage to the WTRU regardless of the WTRU request. For example, a WTRU may not be granted PSM usage (e.g., at 47 and/or 49) by the serving node (e.g., SGSN/MME 240 and/or the core network entity 330) if a setting may prohibit use of a PSM and the WTRU may be a WTRU for which the PSM may be prohibited (e.g., a prohibited group or included in a prohibited group). In such a scenario, the serving node may not allocate an active time to the WTRU and may include a cause code in a TAU Accept message to indicate why PSM was not granted to the WTRU (e.g., AS setting to not use PSM). The serving node(s) may be configured to include and/or may include an active time in the TAU, in an example, if the MME may have a PSM setting that indicates the WTRU may use PSM (e.g., regardless of whether the WTRU fails to request an active time in a TAU). The serving node(s) (e.g., MME and/or SGSN, and/or MSC/VLR) may be configured to use and/or may use an active time with a value provided from the AS (e.g., by way of an interface such as a middle node, intermediate node, IWF or gateway function or the like). The serving node(s) (e.g., MME and/or SGSN, and/or MSC/VLR may include a message or an information element (IE) to inform the WTRU that the active timer may be used (e.g., PSM may be activated). The above described configurations of the serving node may ensure that WTRUs may not ignore an active timer. As described herein, in example, the WTRU and/or serving node such as the SGSN/MME may be configured to employ a NAS message that may be used to activate or deactivate PSM by the WTRU (e.g., Attach Request from the WTRU and Attach Response from the serving node such as the SGSN/MME).

According to an example, a serving node(s) (e.g., MME and/or SGSN, and/or MSC/VLR including 240 and/or the core network entity 230) may be configured to take and/or may take or perform a proactive measure action to change PSM settings in a WTRU. For example, if the WTRU is in idle mode, a serving node may first page (e.g., at 49) the WTRU to force the WTRU to enter connected mode and thereafter change the PSM setting accordingly. For example, a serving node (e.g., the SGSN/MME such as 240) may be configured to page the WTRU (e.g., 250) with the WTRU's international mobile subscriber identity (IMSI), which has the effect of forcing the WTRU to reattach to the system. During the re-attach procedure, the serving node may be configured to enforce a predetermined PSM setting as described above with, for example, a TAU or NAS message. The serving node may be configured to page (e.g., at 49) a WTRU with a system architecture (SAE)-temporary mobile subscriber identity (S-TMSI). When the WTRU comes to connected mode, the serving node may further be configured to initiate a detach procedure (e.g., at 47 and 49) to force the WTRU to re-attach. During the re-Attach procedure, the serving node may enforce the PSM setting as described herein (e.g., above). A MME may be configured to page the WTRU with S-TMSI, which may trigger the WTRU to send an (Extended) Service Request message (e.g., as part of 50). The serving node may then reject the message with a Service Reject and include a cause code that forces the WTRU to reattach to the system using one or more cause codes (e.g., "#10—implicitly detached"). The MME may be configured to take other measures to force the WTRU to send a TAU or Attach Request (e.g., page the WTRU with S-TMSI) and then, after successful completion of the service request procedure, the serving node may deactivate (e.g., as part of 47) one or more of the WTRU's packet data network (PDN) connections or default bearers. While deactivating the last default bearer, the serving may include a cause code that forces the WTRU to reattach (e.g., "re-attach required") or any other session management cause codes.

In one or more examples (e.g., if the WTRU may be in connected mode), the serving node may take one or more measures described above (e.g., after WTRU paging). For example, the MME may perform a network initiated detach with a cause code that may make and/or cause the WTRU to re-attach to the network or system.

A NAS message and/or method may be defined, or a NAS message (e.g., that may defined by 3GPP) may be employed (e.g., EMM NAS Information) and/or used by the serving node (e.g., the SGSN/MME) to enforce a specific PSM setting at the WTRU (e.g., at 47 and 49). For example, a "NAS UE Feature Request" may be provided and/or used to convey a predetermined MME setting for PSM as described above. This message may include a "request type" that indicates if PSM should be activated or deactivated. The message may also include other parameters (e.g., active timer, as determined by the MME) or other information received by the MME from the AS by way of the interface.

According to examples (e.g., when the WTRU receives this message at 49), the WTRU may ignore a previous PSM setting and parameters it may have received (e.g., a previously allocated active timer) and may start using the provided parameters (if any). For example, if the WTRU may already be using PSM and the NAS message described herein and received thereby indicates that the WTRU should stop using PSM, the WTRU may stop using PSM and the associated active timer. Further (e.g., if the NAS message indicates use of PSM), the WTRU may start using PSM and also use the provided active timer and ignore a previously allocated active timer. As such, this method (e.g., procedure or technique) may be used to change the value of the active timer. The WTRU may respond with another NAS message (e.g., "NAS UE Feature Acknowledge") to inform the MME that the WTRU has changed its PSM settings accordingly, and also to inform the use of the active timer. The WTRU may respond with "NAS UE Feature Reject" and include a cause code to indicate why the request was rejected by the WTRU. For example, the WTRU may be configured to reject the provide a command and/or may provide a command to stop using PSM if its power level may be below a certain configured threshold and may return a cause code such as "low power level." IN an example, the WTRU may be configured to send and/or may send a power level metric (e.g., in NAS messages) to indicate its actual power level.

The AS, MME and/or WTRU may be configured to activate or deactivate other features in the WTRU to avoid network congestion. Likewise, other parameters may be included in a request to enable and/or disable PSM.

The serving node (e.g., the SGSN/MME) may be configured to respond (e.g., at 51) to the AS by way of the IWF/SCEF/interface, for example, when a WTRU and/or one or more of the WTRUs within a group respond (e.g., at 50) to the use of the altered PSM settings. For example, the serving node (e.g., the SGSN/MME) may inform (e.g., at 51) the AS (e.g., 210 and/or 310) about how long the WTRU (e.g., 250) may not be reachable.

The serving node (e.g., SGSN/MME) may be configured to inform the AS by way of an interface (e.g., including the IWF/SCEF/interface) that a WTRU has exited PSM and may also provide the length of the active timer that was last provided to the WTRU. For example, the serving node may do so when the WTRU establishes a NAS signaling connection with the serving node using a NAS message (e.g., Service Request, TAU, and the like). If the serving node receives a TAU as the first message and an active timer may be about to (or may be) provided to the WTRU, then the MME sends the notification to the AS after the active timer has been allocated (or after the PSM setting or feature has been modified, for example, activated, deactivated, and the like).

It may be appreciated by those skilled in the art that even though the above disclosure provides examples in the context of an LTE system, the same examples may be apply in the context of the GERAN/UMTS system where an SGSN replaces the MME and the corresponding NAS message may be used to achieve the examples described above, and a NAS messages may also be defined as described above.

The techniques, processes and procedure described in this disclosure may apply to a Global System for Mobile communications radio access network (GERAN), Global System for Mobile communications (GSM), Enhanced Data rates for GSM Evolution (EDGE), GSM EDGE (GERAN), a universal terrestrial radio access network (UTRAN), an evolved universal terrestrial radio access (eUTRAN), first responder network authority (FirstNet), or other cellular networks employing Wideband Code Division Multiple Access (WCDMA), a High Speed Packet Access (HSPA), a vehicle ad hoc network, other radio technologies, such as IEEE 802.16 (e.g., Worldwide Interoperability for Microwave Access (WiMAX)), CDMA2000, CDMA2000 1.times., CDMA2000 EV-DO, Interim Standard 2000 (IS-2000), Interim Standard 95 (IS-95), Interim Standard 856 (IS-856), and the like.

A WTRU may refer to an identity of the physical device, or to the user's identity, such as subscription related identities, e.g., MSISDN, SIP URI, etc., MTC WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a MTC WTRU, UE, terminal, base station, RNC, and/or any host computer.

What is claimed is:

1. A method implemented by a wireless transmit/receive unit (WTRU), the method comprising:
    ending a power mode for a duration of a first time value of an active timer, wherein the power mode relates to saving power by deactivating a radio of the WTRU;
    receiving an unsolicited configuration message indicating to register with a network to make power mode related changes;
    sending an acknowledgement for the unsolicited configuration message;
    sending a registration message to the network related to the power mode;
    receiving a response message including instructions to change the active timer from the first time value to a second time value, and instructions to start the power mode at an expiration of the second time value of the active timer; and
    starting the power mode at the expiration of the second time value.

2. The method of claim 1, wherein receiving the second time value related to the power mode causes the WTRU to start the active timer.

3. The method of claim 1, wherein the active timer is a mobility management timer.

4. The method of claim 1, wherein the power mode ended based on the expiration of a configured periodic registration timer.

5. A wireless transmit/receive unit (WTRU), the WTRU comprising:
    a processor, and
    a transceiver coupled to the processor, the processor and transceiver configured to end a power mode for a duration of a first time value of an active timer, wherein the power mode relates to saving power by deactivating a radio of the WTRU;
    the processor and transceiver configured to receive an unsolicited configuration message indicating to register with a network to make power mode related changes;

the processor and transceiver configured to send an acknowledgement for the unsolicited configuration message;

the processor and transceiver configured to send a registration message to the network related to the power mode;

the processor and transceiver configured to receive a response message including instructions to change the active timer from the first time value to a second time value, and instructions to start the power mode at an expiration of the second time value of the active timer; and the processor and transceiver configured to start the power mode at the expiration of the second time value.

6. The WTRU of claim 5, wherein receiving the second time value related to the power mode causes the WTRU to start the active timer.

7. The WTRU of claim 5, wherein the active timer is a mobility management timer.

8. The WTRU of claim 5, wherein the power mode is ended based on an expiration of a periodic registration timer.

\* \* \* \* \*